(12) United States Patent
Richard et al.

(10) Patent No.: US 9,306,949 B1
(45) Date of Patent: Apr. 5, 2016

(54) CONFIGURE INTERCONNECTIONS BETWEEN NETWORKS HOSTED IN DATACENTERS

(71) Applicant: Amazon Technologies, Inc., Reno, NV (US)

(72) Inventors: Jacques Joshua Richard, Edmonds, WA (US); Peter John Hill, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 63 days.

(21) Appl. No.: 13/795,402

(22) Filed: Mar. 12, 2013

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ..................................... *H04L 63/10* (2013.01)

(58) Field of Classification Search
CPC ....................................................... G06F 21/00
USPC ....................................................... 726/1, 15
See application file for complete search history.

(56) References Cited

U.S. PATENT DOCUMENTS

| | | | | |
|---|---|---|---|---|
| 7,840,701 | B2 * | 11/2010 | Hsu | H04L 29/06 370/401 |
| 8,249,081 | B2 * | 8/2012 | Chang | H04L 29/12066 370/395.3 |
| 2004/0221179 | A1 * | 11/2004 | Seshadri | G06F 21/31 726/15 |
| 2006/0224883 | A1 * | 10/2006 | Khosravi et al. | 713/151 |
| 2010/0115606 | A1 * | 5/2010 | Samovskiy et al. | 726/15 |
| 2010/0235887 | A1 * | 9/2010 | Burch et al. | 726/4 |
| 2012/0179796 | A1 * | 7/2012 | Nagaraj et al. | 709/223 |
| 2012/0233668 | A1 * | 9/2012 | Leafe et al. | 726/4 |
| 2012/0281708 | A1 * | 11/2012 | Chauhan et al. | 370/401 |
| 2012/0303799 | A1 * | 11/2012 | Hadas et al. | 709/224 |
| 2013/0104214 | A1 * | 4/2013 | Beck et al. | 726/7 |
| 2013/0145447 | A1 * | 6/2013 | Maron | 726/6 |
| 2014/0003232 | A1 * | 1/2014 | Guichard et al. | 370/230 |
| 2014/0108665 | A1 * | 4/2014 | Arora et al. | 709/227 |
| 2014/0109171 | A1 * | 4/2014 | Barton et al. | 726/1 |

\* cited by examiner

*Primary Examiner* — Morshed Mehedi
*Assistant Examiner* — Khalil Naghdali
(74) *Attorney, Agent, or Firm* — Baker Hostetler LLP

(57) ABSTRACT

Systems, methods and computer-readable media are described for connecting private networks that may otherwise be isolated. More particularly, the private networks may include private clouds that may be operated on a plurality of datacenters. A determination may be made as to whether network connections between the private clouds may be established and as to what compute resources of the private clouds may be exposed to the network connections. This determination may be used to generate virtual network paths that may be configured to route traffic between the private clouds.

23 Claims, 15 Drawing Sheets

| VCE Routing Table 710 | |
|---|---|
| Destination | Target |
| 172.16.0.0/16 | VPE1 |
| 155.1.1.1 | VPE1 |

FIG. 7

| VPE Routing Table 810 | |
|---|---|
| Destination | Target |
| 172.16.0.0/16 | VPE2 |
| 155.1.1.1 | VPE2 |
| 165.2.2.2 | VCE1 |

FIG. 8

CONFIGURE INTERCONNECTIONS BETWEEN NETWORKS HOSTED IN DATACENTERS

BACKGROUND

Datacenter providers, sometimes referred to as cloud service providers, provide services to various entities, such as corporations, universities, government agencies and other types of customers, to compute resources hosted in one or more datacenters. There are a number of reasons for entities to host their compute resources or at least some of their compute resources in datacenters. For example, hosting their compute resources in datacenters may provide the entities with flexibility in resource allocation as well as providing scalability, improved resource allocation, reduced operating costs and the like.

Often, a cloud service provider virtualizes some or all of the necessary compute resources to generate private clouds of topologies specific to its customers. This virtualization allows the cloud service provider to dynamically scale hardware and software of the compute resources to meet needs and requirements of its customers.

The private cloud of one customer is typically isolated from a private cloud of another customer of the same cloud service provider, even when the two private clouds are hosted on compute resources operating in the same datacenter. The isolation protects each customer from security breaches, among other things, and renders each private cloud a private network inaccessible by the other customers of the same cloud service provider.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 7 illustrates an example routing table for a private cloud of a customer, according to embodiments;

FIG. 8 illustrates an example routing table for a virtual service provider that facilitates communications between private clouds, according to embodiments;

DETAILED DESCRIPTION

Figure 1:
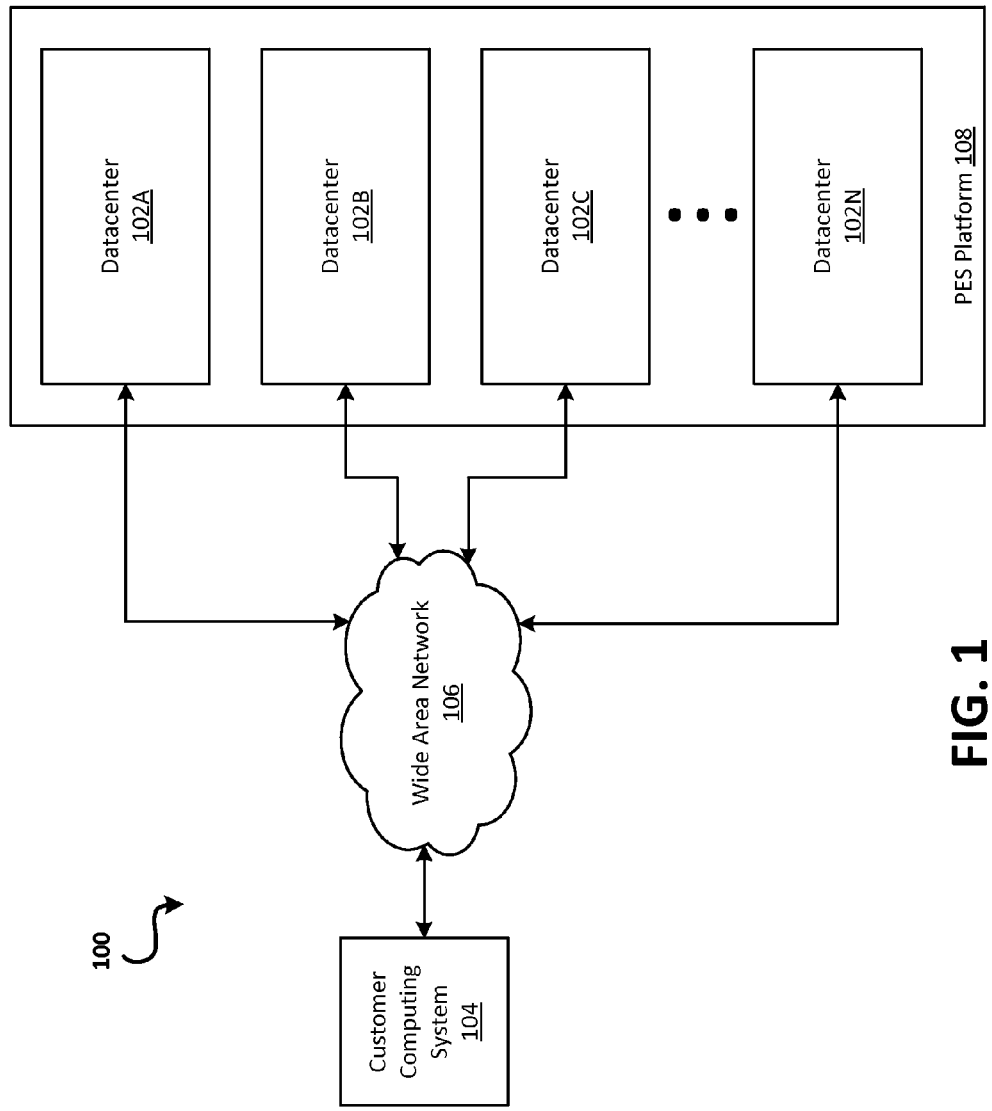
FIG. 1 illustrates an example operating environment of datacenters, according to embodiments.

As noted above, datacenters may be configured to host what are sometimes referred to as private clouds. The private clouds are virtualized private networks that are typically hosted in the datacenters of cloud service providers on behalf of entities like customers of the cloud service providers. The cloud service providers typically host private clouds for a large number of entities with networks or compute resources that may be located within the same datacenter or across multiple datacenters owned or controlled by the same cloud service provider. The entities then typically access the compute resources hosted in their respective private clouds by way of a virtual private network (VPN), for example.

As noted above, the various private clouds hosted by a cloud service provider are generally isolated. Nevertheless, at times, the entities of the cloud service provider may want to share access to one or more of their compute resources hosted on their respective private clouds with each other. For example, a first entity may want to enable a second entity to access one or more of the compute resources in the first entity's private cloud from a compute resource within the second entity's private cloud.

As described more fully herein, the cloud service provider may provide a service that facilitates one or more communication paths between the private clouds of its entities. To provide, for example, the second entity with access to a compute resource on the private cloud of the first entity, the cloud service provider may determine whether the first entity has authorized the second entity to access the first entity's private cloud. Moreover, the cloud service provider may also configure the internal network and compute resources within the datacenters of the cloud service provider to route data between the private clouds of the first and second entities.

Further detail about systems, methods and computer-readable media for configuring and generating the connections between the private clouds is provided herein. It should be appreciated that the subject matter presented herein may be implemented as a computer process, a computer-controlled apparatus, a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

A compute node, which may be referred to also as a computing node, may be implemented on a wide variety of computing environments, such as commodity-hardware computers, virtual machines, computing clusters and computing appliances. Any of these computing devices or environments may, for convenience, be described as compute nodes.

FIG. 1 illustrates an example of a suitable computing environment in which the embodiments described herein may be implemented. A cloud service provider may configure the illustrated computing environment to host private clouds of entities and to enable communication paths between these private clouds that may otherwise be isolated. In particular, FIG. 1 is a system and network diagram that shows an illustrative operating environment 100 that includes a programmable execution service ("PES") platform 108, which may be referred to as PES 108, for implementing private clouds and for providing on-demand access to compute resources, such as virtual machine instances. PES platform 108 can provide compute resources for executing applications on a permanent or an as-needed basis and may be configured as a private network. These compute resources may include various types of resources, such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity, and small resources consisting of fewer processors, smaller amounts of memory and/or smaller storage capacity. Entities may choose to allocate a number of small processing resources as Web servers and/or one large processing resource as a database server, for example.

The compute resources provided by PES platform 108 may be enabled by one or more datacenters 102A-102N, which may be referred herein singularly as "datacenter 102" or in the plural as "datacenters 102." Datacenters 102 may be facilities that house and operate computer systems and associated components and may include redundant and backup power, communications, cooling and security systems. Datacenters 102 may be located in a same geographical area, such as in a same facility, and may be interconnected using private networks, such as high-speed fiber optic networks, controlled and managed by a service provider of PES platform 108. Datacenters 102 may also be distributed across geographically disparate locations and may be interconnected in part using public networks, such as the Internet. One illustrative configuration for datacenter 102 that implements the concepts and technologies disclosed herein is described below with regard to FIG. 2.

Entities of PES platform 108 may access the compute resources provided by datacenters 102 over a wide-area network ("WAN") 106. Although a WAN is illustrated in FIG. 1, it should be appreciated that a local-area network ("LAN"), the Internet, or any other networking topology known in the art that connects datacenters 102 to remote entities and other users may be utilized. It should also be appreciated that combinations of such networks may also be utilized.

An entity or other entities that are customers of PES platform 108 may utilize a computing system 104 to access the compute resources provided by datacenters 102. Customer computing system 104 may be a computer capable of accessing PES platform 108, such as a server computer, a desktop or laptop personal computer, a tablet computer, a wireless telephone, a PDA, an e-reader, a game console, a set-top box or any other computing device.

As is described in greater detail below, customer computing system 104 may be utilized to configure aspects of the compute resources provided by PES platform 108. In this regard, PES platform 108 may provide a Web interface through which aspects of its operation may be configured through the use of a Web browser application program executing on customer computing system 104. Alternatively, a stand-alone application program executing on customer computing system 104 may access an application programming interface ("API") exposed by PES platform 108 for performing the configuration operations. Other mechanisms for configuring the operation of PES platform 108, including launching new virtual machine instances on PES platform 108, may also be utilized.

According to embodiments disclosed herein, capacities of purchased compute resources provided by PES platform 108 can be scaled in response to demand. In this regard, scaling refers to the process of instantiating, which may also be referred to herein as "launching" or "creating," or terminating, which may also be referred to herein as "de-scaling," instances of compute resources in response to demand.

Auto scaling may be one mechanism for scaling compute resources in response to increases or lulls in demand for the resources. Auto scaling may allow entities of PES platform 108 to scale their purchased compute resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in PES platform 108.

PES platform 108 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

Figure 2:
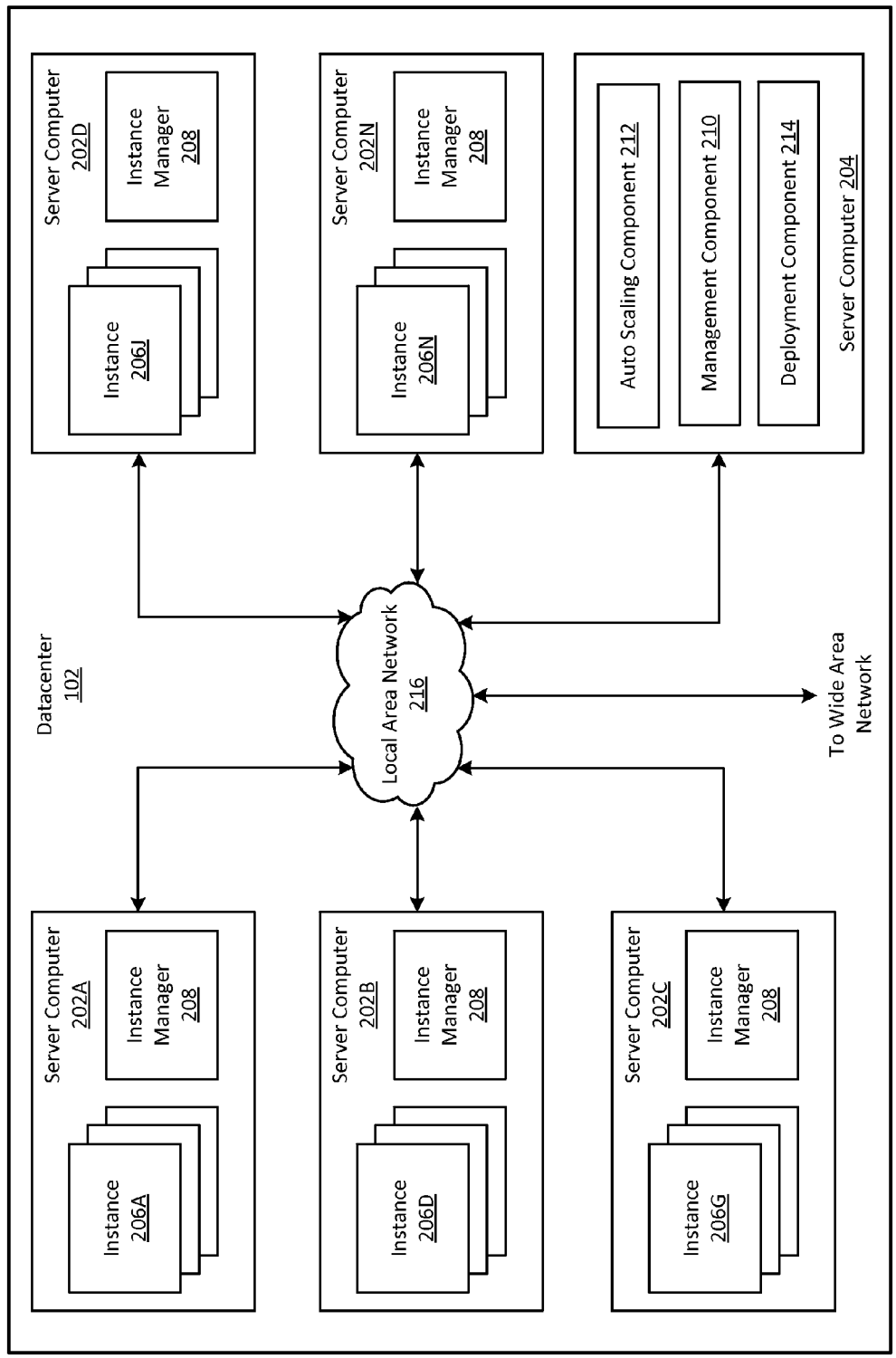
FIG. 2 illustrates an example configuration of a datacenter, according to embodiments.

FIG. 2 is a computing system diagram that illustrates one configuration for datacenter 102 that implements PES platform 108. The example datacenter 102 shown in FIG. 2 may include several server computers 202A-202N, which may be referred herein singularly as "server computer 202" or in the plural as "server computers 202," for providing compute resources for hosting private clouds and for executing applications. Server computers 202 may be standard tower or rack-mount server computers configured appropriately for providing the compute resources described above. For instance, in one implementation server computers 202 may be configured to provide instances 206A-206N of compute resources.

Instances 206A-206N, which may be referred herein singularly as "instance 206" or in the plural as "instances 206,"

may be virtual machine instances. As known in the art, a virtual machine instance is an instance of a software implementation of a machine (i.e., a computer) that executes programs like a physical machine. In the example of virtual machine instances, each server 202 may be configured to execute an instance manager 208 capable of executing the instances. Instance manager 208 may be a hypervisor or another type of program configured to enable the execution of multiple instances 206 on a single server 202, for example. As discussed above, each of instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 102 shown in FIG. 2 may also include a server computer 204 reserved for executing software components for managing the operation of datacenter 102, server computers 202 and instances 206. In particular, server computer 204 may execute a management component 210. As discussed above, an entity of PES platform 108 may utilize customer computing system 104 to access management component 210 to configure various aspects of the operation of PES platform 108 and instances 206 purchased by the entity. For example, the entity may purchase instances and make changes to the configuration of the instances. The entity may also specify settings regarding how the purchased instances are to be scaled in response to demand. The entity may also provide requests to launch instances to management component 210.

As also described briefly above, an auto scaling component 212 may scale instances 206 based upon rules defined by an entity of PES platform 108. For example, auto scaling component 212 may allow an entity to specify scale up rules for use in determining when new instances should be instantiated and scale down rules for use in determining when existing instances should be terminated.

Auto scaling component 212 may execute on a single server computer 204 or in parallel across multiple server computers 202 in PES platform 108. In addition, auto scaling component 212 may consist of a number of subcomponents executing on different server computers 202 or other computing devices in PES platform 108. Auto scaling component 212 may be implemented as software, hardware or any combination of the two. Auto scaling component 212 may monitor available compute resources in PES platform 108 over an internal management network, for example.

As discussed briefly above, datacenter 102 may also be configured with a deployment component 214 to assist entities in the deployment of new instances 206 of compute resources. Deployment component 214 may receive a configuration from an entity that includes data describing how new instances 206 should be configured. For example, the configuration may specify one or more applications that should be installed in new instances 206, provide scripts and/or other types of code to be executed for configuring new instances 206, provide cache warming logic specifying how an application cache should be prepared, and other types of information.

Deployment component 214 may utilize the entity-provided configuration and cache warming logic to configure, prime and launch new instances 206. The configuration, cache warming logic and other information may be specified by an entity using management component 210 or by providing this information directly to deployment component 214. Other mechanisms may also be utilized to configure the operation of deployment component 214.

In the example datacenter 102 shown in FIG. 2, an appropriate LAN 216 may be utilized to interconnect server computers 202A-202N and server computer 204. LAN 216 may be also connected to WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules may also be utilized for balancing a load between each of datacenters 102A-102N, between each of server computers 202A-202N in each datacenter 102 and between instances 206 purchased by each entity of PES platform 108. These network topologies and devices should be apparent to those skilled in the art.

It should be appreciated that datacenter 102 described in FIG. 2 is merely illustrative and that other implementations may be utilized. In particular, functionality described herein as being performed by management component 210, auto scaling component 212 and deployment component 214 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

Figure 3A:
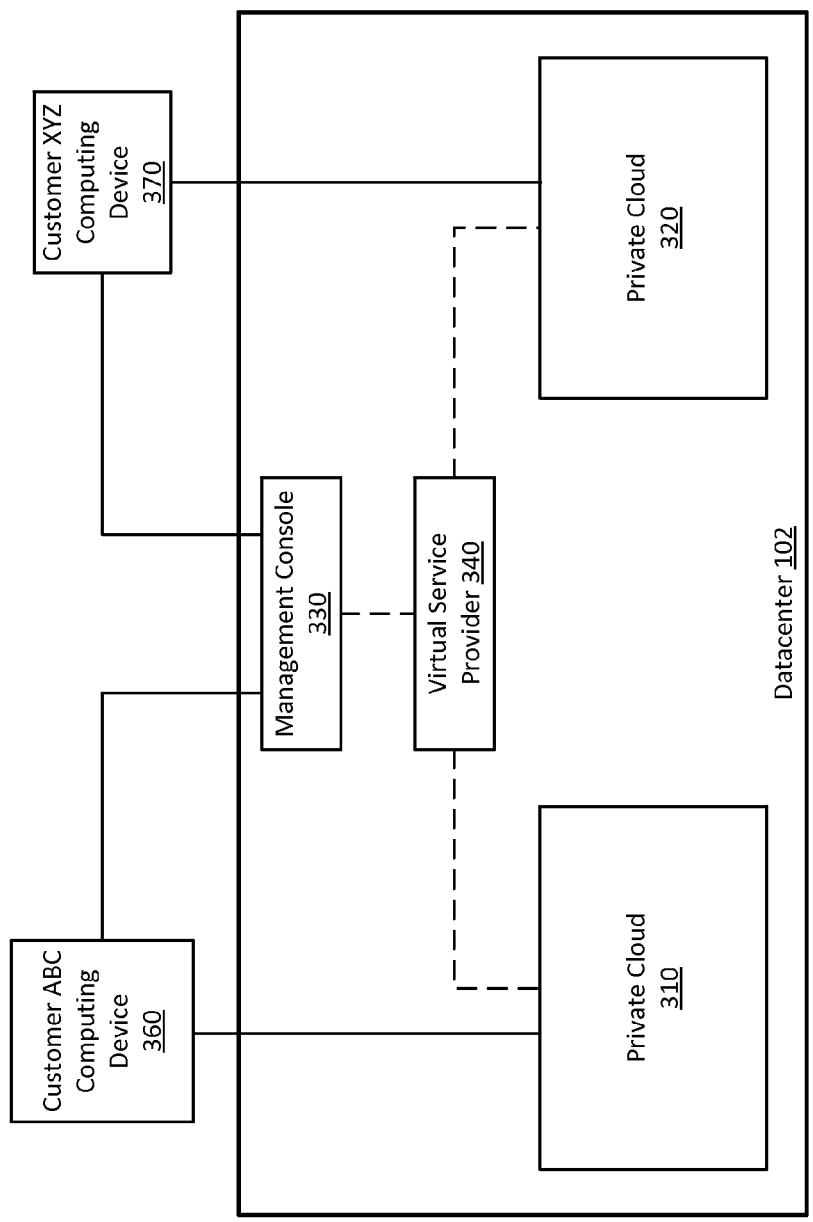
FIGS. 3A, 3B and 3C illustrate a system for configuring and generating network paths between private clouds, according to embodiments.

FIG. 3A illustrates an example datacenter 102 that may host multiple private clouds. Although FIG. 3A shows datacenter 102 as hosting two private clouds 310 and 320, that is for ease of explanation only. Datacenter 102 will typically host many more private clouds. Likewise, although private clouds 310 and 320 are shown as being hosted on a single datacenter 102, these private clouds may span multiple datacenters 102, such as in PES 108 of FIG. 1. In an example, private cloud 310 may be executed on multiple server computers allocated from multiple datacenters 102. In another example, private cloud 310 may be hosted on one datacenter 102A of FIG. 1, whereas private cloud 320 may be hosted on another datacenter 102B of FIG. 1. Other implementations of private clouds 310 and 320 should be apparent to those skilled in the art.

Private clouds 310 and 320 may be associated with different entities, shown as customers ABC and XYZ in FIG. 3A. As described above, each entity may use a computing system, shown as computing devices 360 and 370, to access datacenter 102 and its respective private clouds 310 and 320. While computing devices 360 and 370 are described as physical computers, they may in fact represent a network that includes one or more types of computing resources including, for example, virtual machine instances that each entity executes within its home network.

Private clouds 310 and 320 are isolated from each other such that compute resources of private cloud 310 may not be accessible to private cloud 320 from within datacenter 102, and vice versa. For example, customer ABC may use computing device 360 to access compute resources, such as instances of virtual machines, on its private cloud 310 but may not access compute resources hosted on private cloud 320 of customer XYZ. Likewise, customer XYZ may use computing device 370 to access a compute resource hosted on its private cloud 320 but may not access a compute resource hosted on private cloud 310. A compute resource hosted on a private cloud may be referred to as a computing resource of the private cloud, a compute resource of the private cloud or a virtual compute resource.

To facilitate a managed connection between private clouds 310 and 320, datacenter 102 may execute a management console 330. Management console 330 may be configured to provide entities with at least two functions. A first function may be to verify that the connection is authorized. For example, management console 330 may allow customer ABC to demonstrate that customer XYZ has given permission to customer ABC to access its private cloud 320. In another example, management console 330 may allow customer XYZ to demonstrate that it allowed customer ABC to access its private cloud 320. Other examples also could be used to verify that customer XYZ has an authorized access to customer ABC's private cloud 310.

A second function of management console 330 may be to permit an entity to define any compute resources that may be accessible to another entity at the private clouds. For example, management console 330 may allow customer ABC to define a set of compute resources that are hosted on its private cloud 310 and that may be accessed by customer XYZ through private cloud 320. Likewise, management console 330 may allow customer XYZ to define a list of addresses, such as internet protocol (IP) addresses, that are associated with compute resources of its private cloud 320 and that may be exposed to private cloud 310.

To allow an entity to define these aspects of private clouds, management console 330 may include an interface through which the entity may define whether its private clouds may be accessible by other entities and what compute resources of its private clouds are to be made accessible. The interface may be a Web interface, an application programming interface, or other mechanisms. These other mechanisms may include but are not limited to, for example, customer ABC calling or e-mailing a contact of the service provider to authorize customer XYZ's access to some or all of the compute resources of private cloud 310.

Management console 330 may be executed by server computer 204 of FIG. 2. For example, management console 330 may be integrated with management component 210 of FIG. 2, management console 330 may be an instance of management component 210 or management console 330 may be a standalone application. Management console 330 may also be executed by other server computers of datacenter 102 as instances within private clouds 310 and 320.

Once management console 330 verifies access of another entity to a private cloud and determines what compute resources of the private cloud are associated with the access, management console 330 may allow a compute resource at datacenter 102 to generate a connection between the private clouds of the two entities. The compute resource is shown in FIG. 3A as a virtual service provider 340, which may be an instance of a virtual machine, such as instance 206A of FIG. 2, configured to facilitate the connection, as further described in FIGS. 3B and 3C.

This connection may include a virtual network path between compute resources of the private clouds that have been authorized to communicate and may be referred to also as a communication path, a virtual communication path or an overlay network path. The virtual network path connects the private clouds and is built on top of the underlying physical network of datacenter 102. As such, virtual service provider 340 may provide routing tables to private clouds 310 and 320 and may direct data between them over the virtual network path and the underlying physical network of datacenter 102.

Figure 3B:
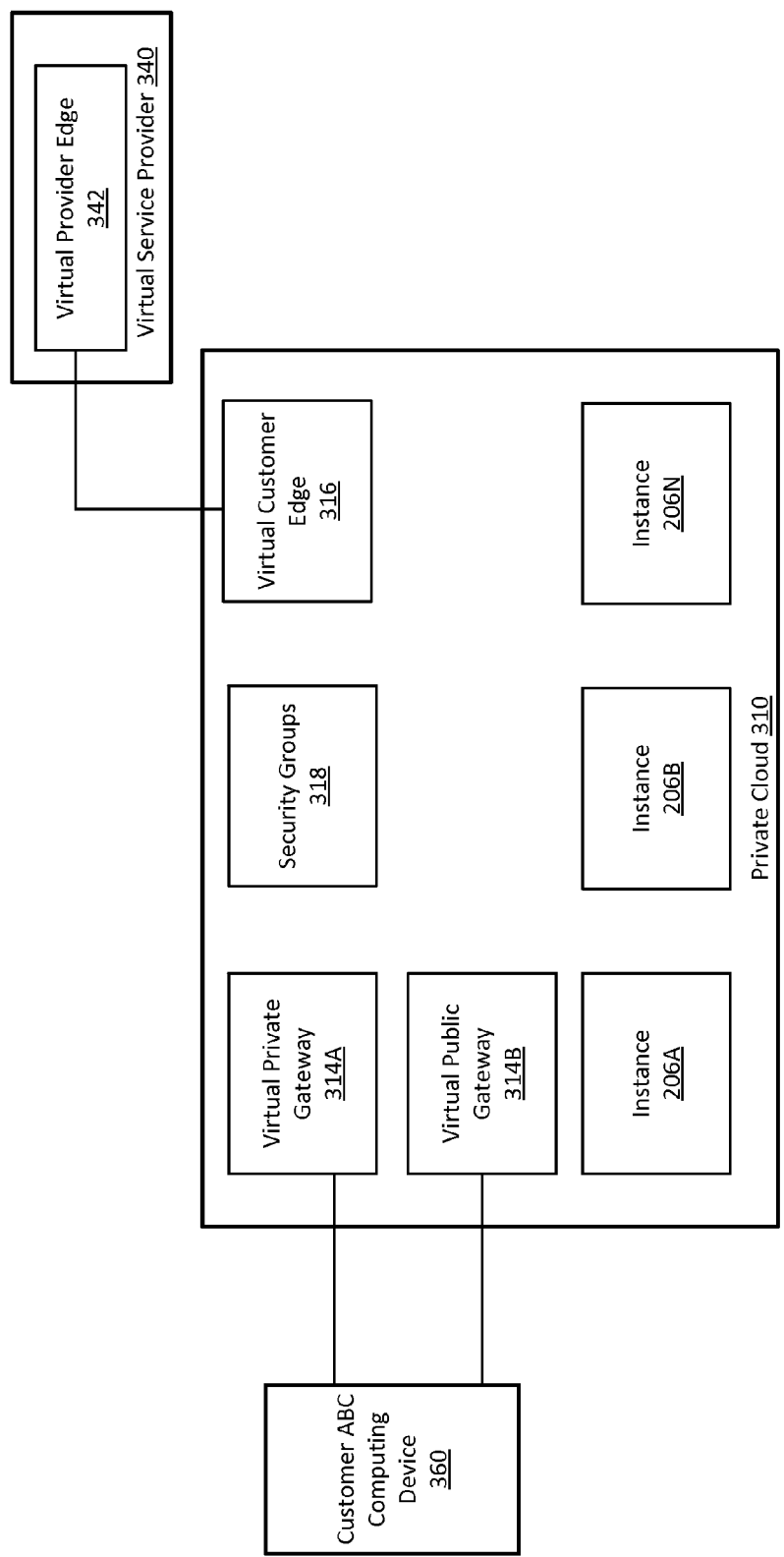

FIG. 3B illustrates an example private cloud that the cloud service provider may configure to communicate with another private cloud over a virtual network path managed by a virtual service provider. Although FIG. 3B describes private cloud 310, similar embodiments may apply to other private clouds across datacenters 102, such as private cloud 320. Private cloud 310 may be a set of instances 206A-206N that may be configured in a topology specified by customer ABC and that may not be shared with any other entities. This topology may be a private cloud topology and may include subnets and routing tables that control traffic routing for the subnets. Instances 206A-206N may be addressed using private IP addresses in a subnet range that may be defined by customer ABC, such as 10.0.0.0/16, and that may be used to generate the routing tables of private cloud 310. The subnets may logically group the instances based on IP address ranges, for example. Although specific addresses are used throughout this disclosure, one skilled in the art will appreciate that these addresses are illustrative and that other addresses may be used.

Additionally, to expose an instance to a public network outside of datacenter 102 and PES 108, the cloud service provider may assign a static and public address to the instance. Alternatively, the cloud service provider may allow customer ABC to use network address translation ("NAT") techniques to route traffic from an instance that has a private IP address to the public network. For example, customer ABC may configure instance 206A as a NAT instance that routes traffic from instances 206B-206N, which may have private IP addresses, to customer ABC's home network, and this home network may reside outside of datacenters 102 and PES 108. As such, this addressing may enable customer ABC to access its instances 206A-206N from computing device 360 by using, for example, a secure shell ("SSH") or a remote desktop protocol running on computing device 360.

The cloud service provider may also allow customer ABC to connect its private cloud 310 to its home network, thus extending customer ABC's security and management policies from its home network to its private cloud 310. For example, a virtual private gateway 314A may be an instance hosted on private cloud 310 and configured to manage a VPN tunnel and may use an internet protocol security ("IPsec") protocol to securely connect private cloud 310 to customer ABC's home network.

Customer ABC can also configure its private cloud 310 to connect to a public network, such as the Internet. For example, a virtual public gateway 314B may be an instance hosted on private cloud 310 and configured to enable traffic to flow between the public network and instances 206A-206N.

Virtual private gateway 314A and virtual public gateway 314B may support border gateway protocol ("BGP") and may use dynamic routing with the connection between private cloud 310 and customer ABC's home network. The route tables of private cloud 310 may specify which subnets may use what gateway.

In some embodiments, private cloud 310 may also allow customer ABC to define security policies that control inbound and outbound traffic to private cloud 310 and its instances and subnets. For example, private cloud 310 may include security groups 318 that are configured as firewalls to control the traffic allowed in and out of a group of instances 206A-206N. Instances assigned to a security group of security groups 318 need not be in the same subnet. Conversely, instances in the same subnet need not be assigned to the same security group. For example, instance 206A may be associated with a security group of security groups 318, which may allow all HTTP inbound and outbound accesses having any source and destination IP addresses. Likewise, instance 206B may be associated with another group of security groups 318 that may allow all HTTPS inbound and outbound accesses having any source and destination IP addresses.

Private cloud 310 may not only be connected to customer ABC's computing device 360 or home network, but may also be connected to other private clouds of other entities, such as private cloud 320, by way of virtual service provider 340. Private cloud 310 may host a virtual customer edge 316 that may be configured to connect private cloud 310 to these inter-private clouds communication paths. Virtual customer edge 316 may be a virtual router or a virtual gateway, e.g. an instance of a router or a gateway, that is associated with a routing table that may direct traffic destined to private cloud 320 to a virtual provider edge 342 of virtual service provider 340. The routing table may be a virtual routing table that stores an IP address associated with virtual provider edge 342 as a destination of traffic routed from virtual private network 310 to other virtual private networks including private cloud 320.

The cloud service provider may configure virtual service provider 340 as an instance or a component of an instance that is hosted in datacenter 102 and that executes service provider edge 342. For example, the cloud service provider may configure a private cloud that hosts instances of virtual service providers. In another example, the cloud service provider may instance manager 208 of FIG. 2 to run virtual service provider 340.

Depending on how virtual service provider 340 is configured, virtual provider edge 342 may be an instance within a private cloud or may be a component within an instance. Virtual provider edge 342 may also be a virtual router or a virtual gateway that may include a virtual routing table that stores IP addresses of instances 206A-206N, subnets of private cloud 310, or a NAT instance of private cloud 310 as destinations of inbound traffic to private cloud 310. This virtual routing table may also store IP addresses of other virtual provider edges associated with other private clouds as destinations of traffic outbound from private cloud 310. For example, when a virtual network path is generated between private clouds 310 and 320, the cloud service provider may associate a similar virtual provider edge (not shown in FIG. 3B) with private cloud 320. As such, virtual provider edge 342 may use its virtual routing table to direct traffic to this other virtual provider edge when the traffic is destined to private cloud 320.

Additionally or alternatively to storing IP addresses, the virtual routing table of virtual provider edge 342 may store identifiers, such as labels, as described herein below. In other words, virtual provider edge 342 may enable traffic to be directed between two network nodes, in this case private clouds 310 and 320, rather than between endpoints such as a source instance at private cloud 310 and a destination instance at private cloud 320. The routing tables of virtual customer edge 316 and virtual provider edge 342 are further described in FIGS. 7 and 8, respectively.

Because private clouds 310 and 320 may be overlay networks, data exchanged between the two clouds need to be also routed over the underlying physical network of datacenter 102. Overlay networks are virtualized private networks that are built on top of the underlying physical network and physical compute resources of datacenter 102. To facilitate the routing of the data between the overlay networks and the underlying physical networks, virtual provider edge 342 may translate IP addresses of the source and destination instances of private clouds 310 and 320 to IP addresses of the underlying physical network and vice versa. This translation may allow the traffic between the source and destination instances of private clouds 310 and 320 to be routed over the underlying physical network and may use mapping tables that map IP addresses of the private clouds to IP addresses of the underlying physical network. To also allow node-to-node communication, virtual provider edge 342 may use a label that uniquely identifies the virtual provider edge associated with private cloud 320 such that traffic outgoing from private cloud 310 and destined to private cloud 320 may be directly routed to the virtual provider edge associated with private cloud 320.

When virtual provider edge 342 receives a packet from virtual customer edge 316 destined to an instance at private cloud 320, the received packet may include an IP address of the source instance of private cloud 310 and a destination IP address of the instance at private cloud 320. In an example, the received packet may include IP addresses of NAT instances instead of the actual instances. Virtual provider edge 342 may add a source label to the received packet that identifies virtual provider edge 342 and a destination label that identifies the virtual provider edge associated with private cloud 320, and may also encapsulate the packed with source and destination IP addresses of the underlying source and destination physical resources. Further detail about the addressing of the packet is described in FIGS. 9A and 9B.

As described above, virtual customer edge 316 and virtual provider edge 342 may be implemented as standalone instances or may be integrated with other instances. For example, virtual provider edge 342 may be an instance on server computer 204, whereas virtual customer edge 316 may be included within a NAT instance of private cloud 310.

Figure 3C:
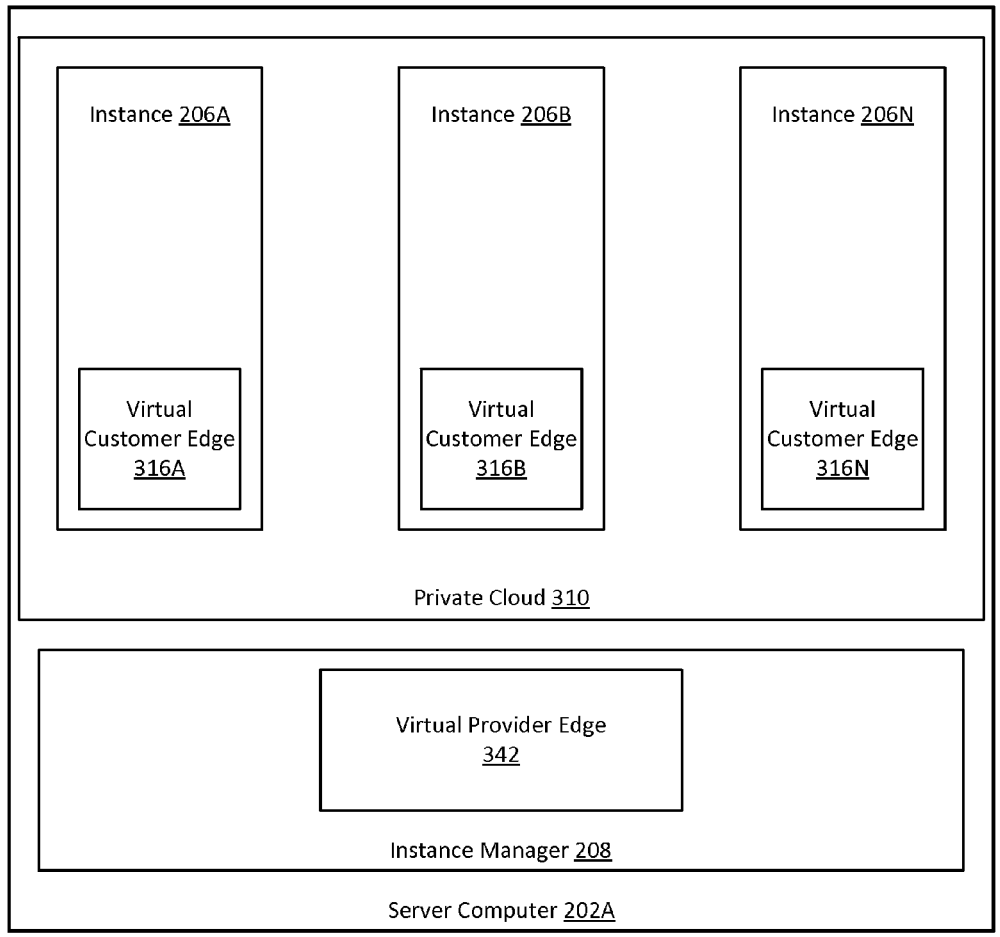

FIG. 3C illustrates an example configuration that instantiates virtual customer edge 316 and virtual provider edge 342. As shown in FIG. 3C, each of instances 206A-206N may execute a virtual customer edge 316A-316N. In comparison, instance manager 208 may execute virtual provider edge 342. Likewise, private cloud 320 may execute its virtual customer edge as an instance or within its instances, whereas instance manager(s) 208, associated with private cloud 320, may execute its virtual provider edge.

Figure 4:
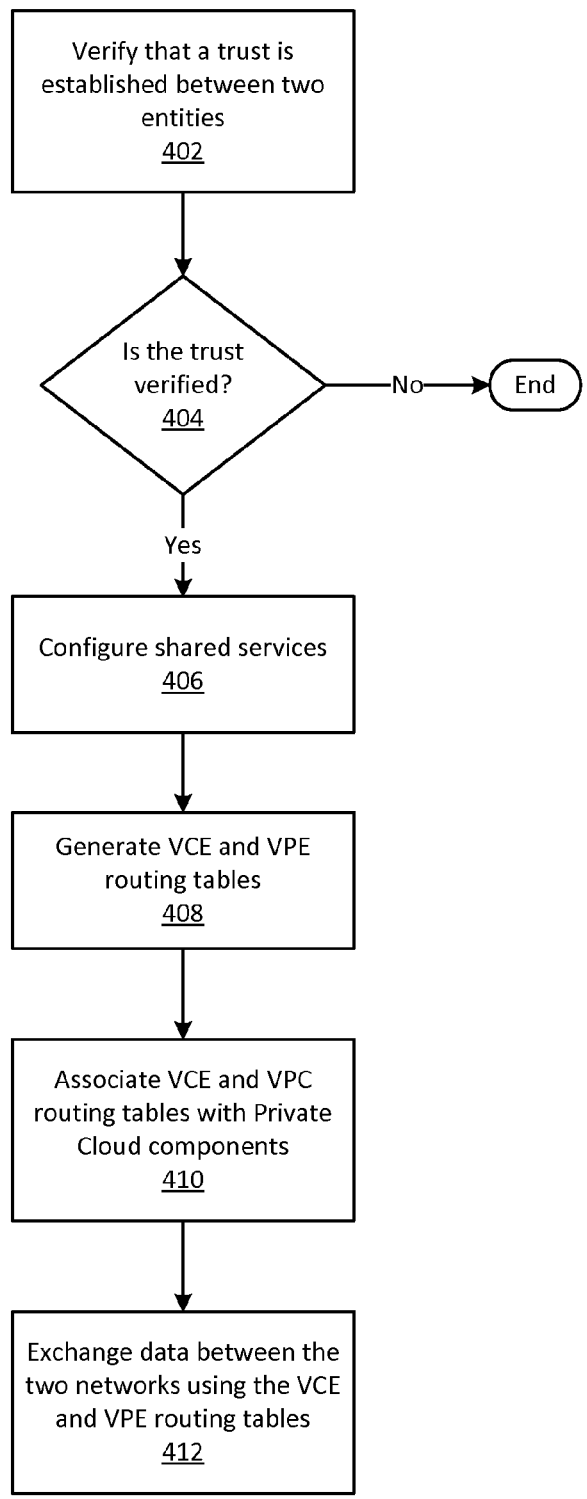
FIG. 4 is a flowchart depicting an example procedure for configuring and generating network paths between private clouds, according to embodiments.

Turning now to FIG. 4, FIG. 4 illustrates example procedures for configuring and generating a virtual network path between private clouds 310 and 320. It may be appreciated that there are embodiments that implement the procedures of FIG. 4 in a different order than is depicted, or that implement fewer or more procedures than is depicted. The procedures may be performed by components of PES 108, such as management console 330 and virtual service provider 340 of datacenter 102. Operation 402 illustrates verifying that a trust is established between entities associated with the private clouds. Although the trust may be established independently of PES 108, PES 108 may still verify that the trust is established. Alternatively, a component of PES 108 may be configured to facilitate and generate the trust between the entities. The trust may be information indicative that an entity has allowed access to its private cloud to another entity. For example, the trust may be an authorization that is provided by customer ABC to customer XYZ and that allows customer XYZ to access private cloud 310. Further detail about how the trust is verified is further described in FIGS. 5A, 5B and 5C.

Operation 404 illustrates determining whether the trust is verified. For example, PES 108 may determine whether customer ABC authorized customer XYZ's access to private cloud 310 under Operation 402. If the trust is not verified, the procedures end. Otherwise, operation 406 may be performed. Operation 406 illustrates configuring shared services between the private clouds. This configuration may include a definition of what compute resources within the private clouds are to be made accessible. For example, PES 108 may provide an interface to customers ABC and XYZ. Customers ABC and XYZ may then enter information at the interface to specify which subnets, IP address ranges, instances and the like of private clouds 310 and 320, respectively, may be exposed. Customer ABC may decide to render all instances on its private cloud 310 accessible to private cloud 320 but may want to hide the IP addresses of the instances. In such a case, the interface may allow customer ABC to specify an address of a NAT instance that translates and tracks the IP addresses of the instances from private to public addresses. Similarly, customer XYZ may decide to only allow a particular subnet on its private cloud 320 accessible to private cloud 310. The interface may allow customer XYZ to enter a public IP address of the particular subnet. Further detail about an example interface is described in FIGS. 6A and 6B.

Operation 408 illustrates generating routing tables to be associated with virtual customer edges and virtual private edges. PES 108 may generate the routing table 2 based on the input of customer ABC's and XYZ's information provided under Operation 406. A routing table associated with a virtual customer edge of a private cloud may be a virtual routing table that is based on mappings of IP addresses of the private cloud's compute resources, and of IP addresses of virtual provider edges that are associated with the private cloud. For example, the routing table of virtual customer edge 316 may use IP addresses of instances 206A-206N and an IP address of virtual provider edge 342. A routing table associated with a particular virtual provider edge may be a virtual routing table that is based on mappings of IP addresses of virtual customer edges, IP addresses of underlying physical compute resources, and network labels of virtual provider edges associated with the particular virtual edge. For example, the routing table of virtual provider edge 342 may use an IP address of the virtual customer edge 316, a label of the virtual private edge associated with private cloud 320 and IP addresses of server computers 202A-202N, which may be hosting private clouds 310 and 320. Further detail about example routing tables is described in FIGS. 7 and 8.

Operation 410 illustrates associating the routing tables with private cloud components. For example, PES 108 may configure virtual customer edge 316 and virtual provider edge 342, as shown in FIG. 3C, and may provide the corresponding routing tables to these edges. Operation 412 illustrates exchanging data between private clouds over virtual paths that have been configured based on operations 402-410. For example, an instance of private cloud 310 may generate a packet destined to an instance of private cloud 320. The packet is routed through at least virtual customer edge 316, virtual provider edge 342, the virtual provider edge associated with private cloud 320 and the virtual customer edge of private cloud 320. The packet may also be routed over the underlying physical compute resource such that it is delivered from the server computer that hosts private cloud 310 to the server computer that hosts private cloud 320. Further detail about an example addressing of the packet is described in FIGS. 9A and 9B.

As described above, a possible step in the procedure for generating a virtual path between two private clouds that are associated with two different entities and that are otherwise isolated and private is to verify that a trust has been established between the two entities. This is depicted in Operations 402 and 404. This verification can be implemented using different techniques that may be grouped generally into two categories: techniques where the trust is established independently of PES 108 and techniques where PES 108 facilitates the establishment of the trust. The former category may include, for example, customers ABC and XYZ communicating outside of PES 108 to agree or generate information indicative of the trust such as a code, password or token that is presented to PES 108. The communication may be any of a phone call, e-mail, person-to-person or any type of interaction between the customers ABC and XYZ. PES 108 may provide an interface that may be used by customers ABC and XYZ to input the information indicative of the trust. If the information inputted by customers ABC and XYZ match, PES 108 may determine that the trust is verified.

The latter category may include, for example, an instance at datacenter 102 that transmits a communication, such as an e-mail, to customers ABC and XYZ. The communication may include a link that customers ABC and XYZ need to click or follow to indicate that they agree to the trust. Another example includes an instance at datacenter 102 generating and sending a passcode to customer ABC and providing an interface to customer XYZ to enter the passcode. When customer XYZ enters a passcode that matches the passcode sent to customer ABC, PES 108 may determine that the trust is verified. Other examples and implementations may also be used as shown in FIGS. 5A, 5B and 5C.

Figure 5A:
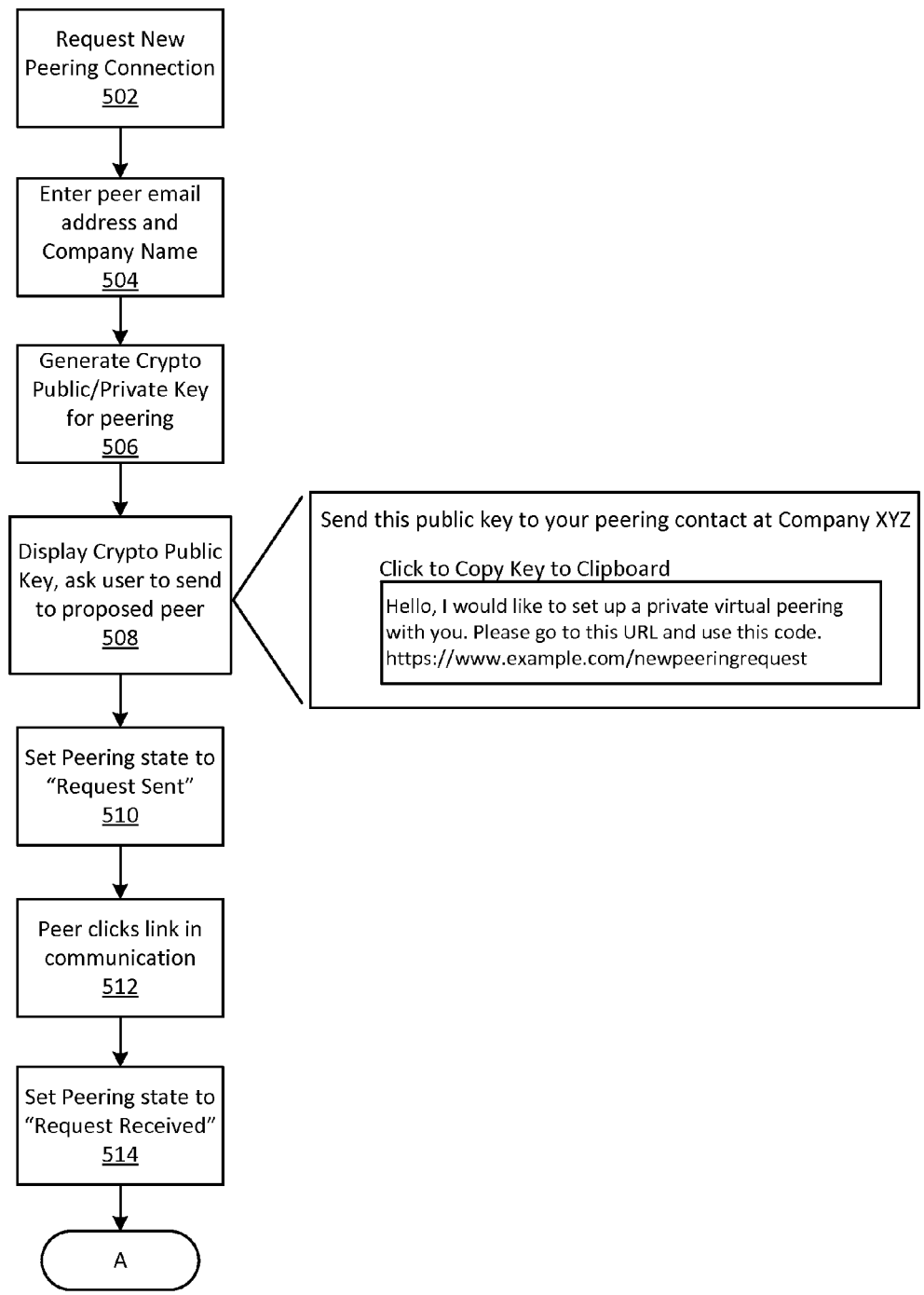
FIGS. 5A, 5B and 5C are flowcharts depicting an example procedure for configuring a network path between private clouds, according to embodiments.
Figure 5B:
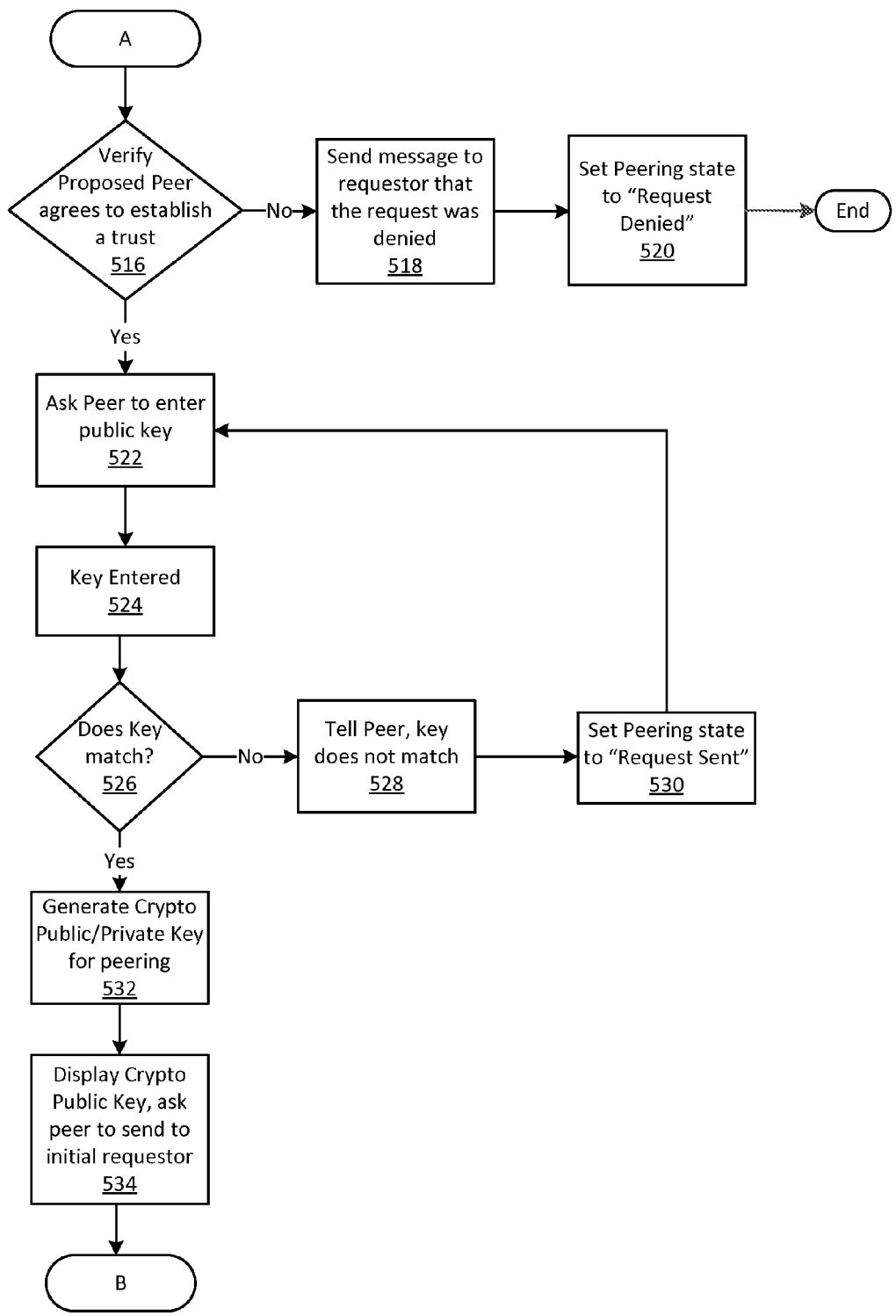
Figure 5C:

The procedures shown in FIGS. 5A, 5B and 5C illustrate PES 108 using a two-factor verification to determine that customers ABC and XYZ have established the trust. It may be appreciated that there are embodiments the implement the procedures of FIGS. 5A, 5B and 5C in a different order than is depicted, or that implement fewer (or more) procedures than is depicted. This two-factor verification includes receiving from customer ABC information indicative that customer XYZ has agreed to the trust and information from customer XYZ, indicative that customer ABC has also agreed to the trust. The execution of the operations may be distributed between components of PES 108 and computing devices 360 and 370. For example, management console 330 may be configured to generate the information associated with PES 108 and to receive the information entered by customers ABC and XYZ at computing devices 360 and 370 as described herein below. As used herein, requestors and peers are entities that are customers of the cloud service provider and that are establishing the trust.

Operation 502 illustrates computing device 360 requesting from PES 108 a new peering connection. PES 108 may provide an interface, as a Web interface, to allow customer ABC's request for the new peering connection. Operation 504 illustrates customer ABC using computing device 360 to enter an email address and a company name of the peer, e.g., customer XYZ. This information may be entered at the interface provided by PES 108. Once the information is received by PES 108, operation 506 illustrates PES 108 generating a cryptographic pair of public and private keys associated with the peering connection. For example, PES 108 may execute an asymmetric key algorithm to generate the cryptographic pair of keys.

Operation 508 illustrates PES 108 transmitting information indicative of the public key to computing device 360 to be presented to customer ABC. The information may include the public key, a uniform resource locator ("URL") address to a page managed by PES 108 and a message that can be copied and sent to the peer, such as an e-mail to customer XYZ, for example. Operation 510 illustrates PES 108 maintaining a state of the trust between the peers. For example, PES 108 may set a peering state to "request sent" and may update the state once related information is further received. Operation 512 illustrates the peer, e.g., customer XYZ, using computing device 370 to receive the communication that was sent by customer ABC and to follow the URL address in the communication. Operation 514 illustrates PES 108 updating the state of the trust. For example, when the URL address is followed, PES 108 may determine that customer XYZ has received the communication and may update the peering state to "request received."

Operation 516 illustrates PES 108 verifying that the peer has agreed to establish a trust. For example, when the page associated with the URL presents a question to customer XYZ asking whether customer XYZ approves the trust or not, the page may include an answer field that may be toggled between "yes" and "no." If the answer is "no," operation 516 may follow operation 518. Otherwise, operation 522 may be followed. Operation 518 illustrates PES 108 sending a communication to the requestor, e.g., customer ABC, indicating that the request was denied. The communication can be in a form of an e-mail that is generated by PES 108. This message may be followed by an update of the peering state (operation 520). For example, PES 108 may set the peering state to "request denied" and may also end the procedure.

Operation 522 illustrates PES 108 requesting a public key to be entered for verification that the trust is established. For example, PES 108 may provide an interface that is presented at computing device 370 and that includes a field for entering the public key. Operation 524 illustrates PES 108 receiving the key entered at the interface presented at computing device 370. Operation 526 illustrates PES 108 determining whether the received public key matches the public key that was originally transmitted to the requestor. This determination may be based on, for example, a comparison between the received public key and the private key. If there is no match, operation 526 may follow operation 528. Otherwise, operation 532 may be followed. Operation 528 illustrates PES 108 providing a communication to the peer that the key does not match. This communication can be, for example, a message presented on the interface that was used to enter the public key. PES 108 may also update the peering state to "request sent" under operation 530 until a new public key is entered at the interface.

Operations 532-546 are similar to Operations 506-526 but are executed in an order that substitutes the requestor and the peer. More particularly, PES 108 may generate a new pair of cryptographic keys that are associated with the peer, request the peer to communicate the public key from the pair to the requestor, update the peering state to "request acknowledged/ reply sent," determine whether the requestor followed the URL page transmitted in the communication, update the peering state to "request acknowledged/reply received," request the requestor to enter a public key from the communication, receive the public key and determine whether the received public key matches the public key associated with the peer.

When the received public key does not match the public key associated with the peer, PES 108 may perform operation 548 to generate a communication that informs the requestor of the mismatch. PES 108 may also update the peering state to "request acknowledged/reply sent" at operation 550 until a new public key is entered and received from the requestor. When the received public key matches the public key associated with the peer, PES 108 may perform operation 552 by updating the peer state to "established." The update may indicate that the trust has been verified.

Figure 6A:
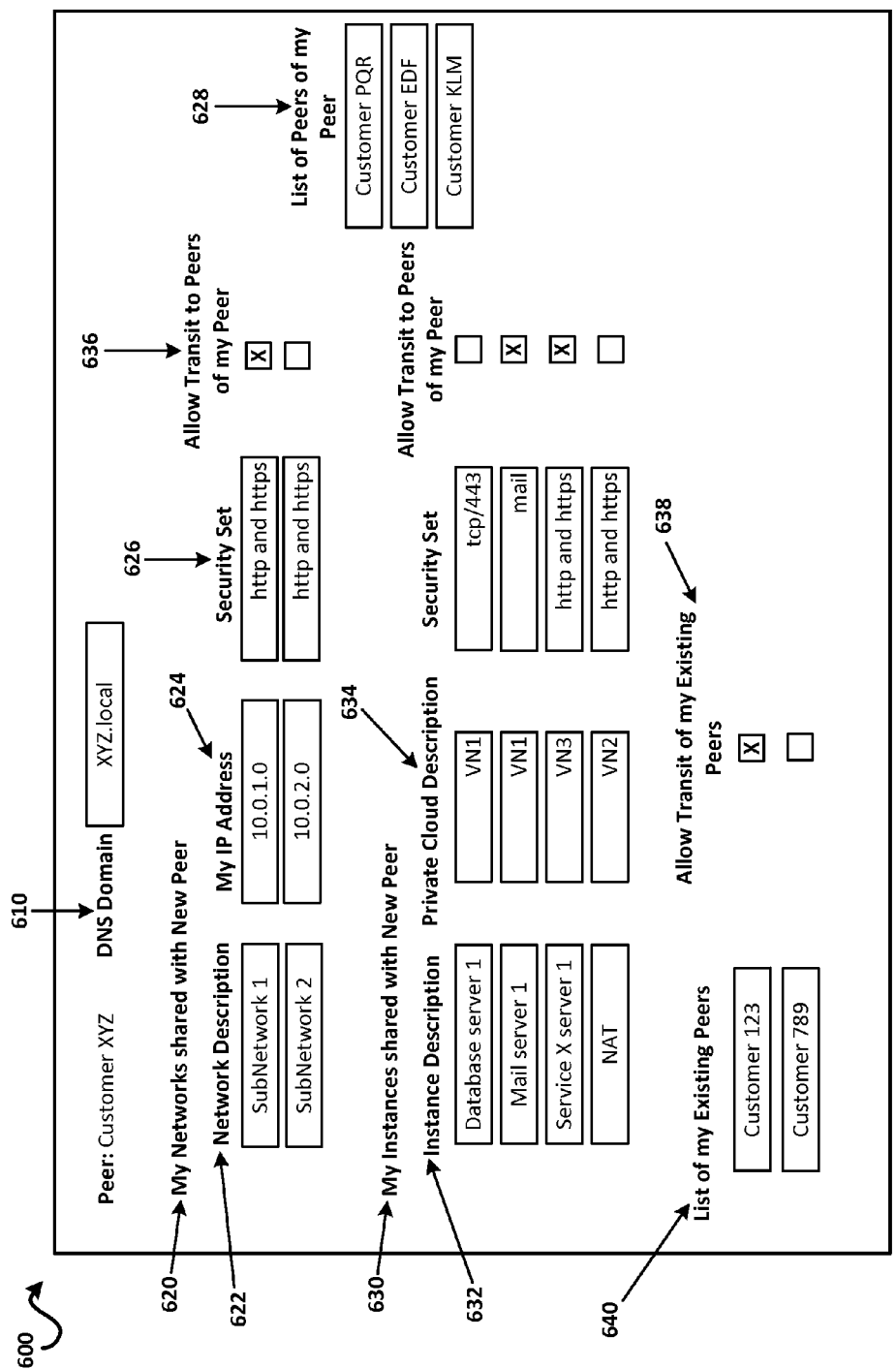
FIGS. 6A and 6B are example user interfaces for configuring a network path between private clouds, according to embodiments.
Figure 6B:
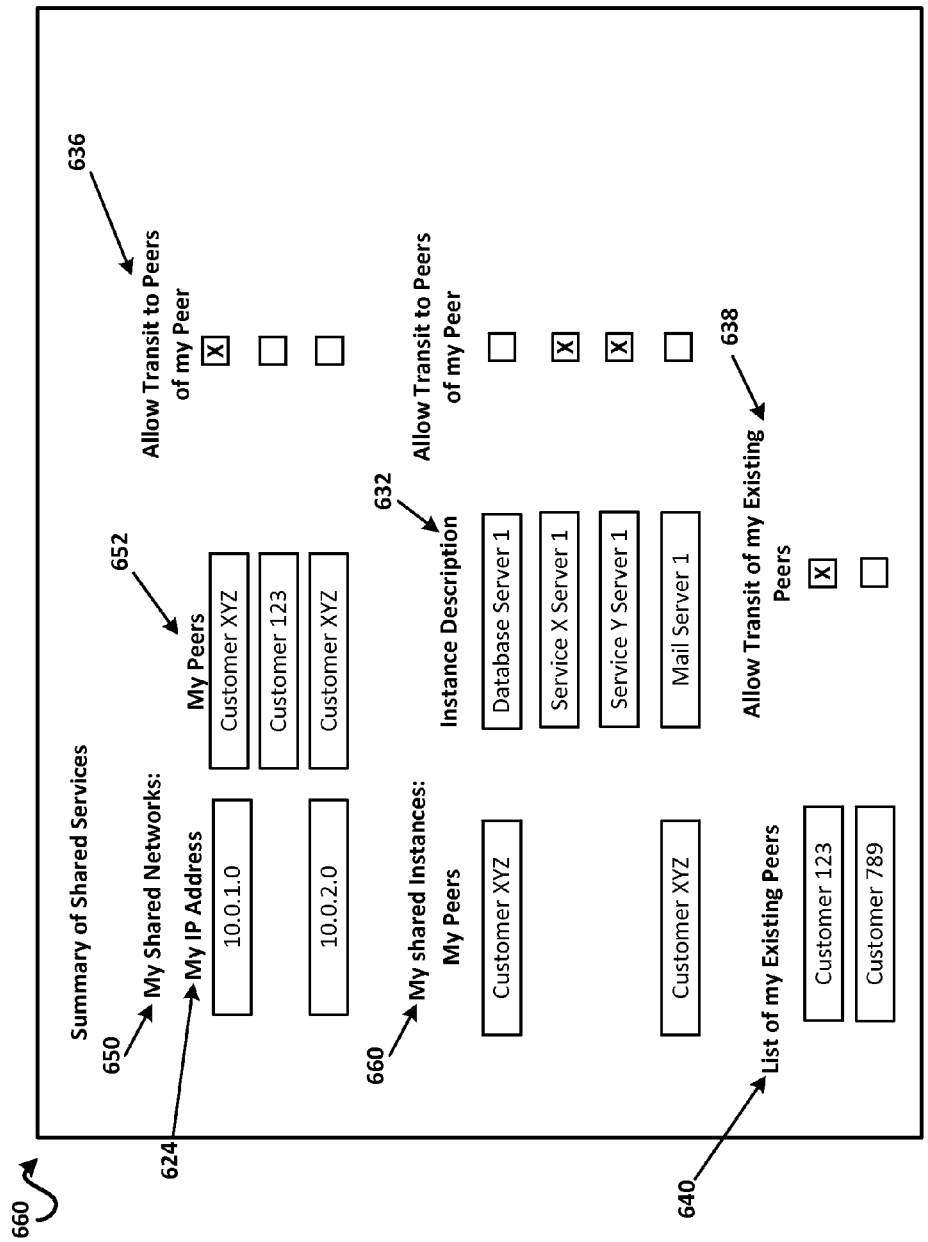

Turning now to FIGS. 6A-6B, when the peer state is set to "established," PES 108 may determine that a peering connection between private clouds 310 and 320 is ready for use as shown in Operation 554 of FIG. 5. The determination may trigger PES 108 to initiate the configuration of the virtual network path between the two private clouds by generating and providing an interface to customers ABC and XYZ for defining compute resources should be made accessible. If no input is received at the interface, a default configuration may be applied. For example, the default configuration may prohibit instances from being shared and may block traffic between private clouds 310 and 320. Another default configuration may instead allow access to all compute resources on the two private clouds. One skilled in the art may implement various default configuration based on, for example, a predefined level of security or isolation between the private clouds.

Various implementations of the interface can also be used. For example, PES 108 may generate a communication in the form of, for example, an e-mail that is transmitted to customers ABC and XYZ. The communication may request customers ABC and XYZ to respond back with information identifying the compute resources that should be shared. The identification may be based on IP addresses, a domain name system ("DNS") and other information that may identify the compute resources. Another implementation of the interface may include using a phone interface. For example, PES 108 may transmit a phone number to customers ABC and XYZ. When each of customers ABC and XYZ calls the phone number, an administrator at PES 108 may answer and enter the configuration information that may be provided during the phone call. The administrator may be an actual person or may be an automated process. Other examples and implementations may also be used as shown in FIGS. 6A and 6B.

FIGS. 6A and 6B provide an example network-based interface for configuring the private cloud path. Although the two figures show graphical user interfaces ("GUIs") 600 and 660, respectively, that may be presented to customer ABC, similar GUIs may also be generated and provided to customer XYZ and to other entities. GUIs 600 and 660 may be generated by, for example, management console 330 and may be presented to customer ABC at, for example, computing device 360.

GUI 600 of FIG. 6A may generally include information about compute resources that will be shared with a peer, e.g., customer XYZ, and information about the peer. As shown in FIG. 6A, the information about the peer, shown under field 610, may identify the peer and may identify the peer's private cloud that may have access to customer ABC's compute resources. Field 610 may allow customer ABC to enter a DNS domain or an IP address (not shown) of customer XYZ's private cloud 320. The information about the compute resources may identify the subnets and instances of customer ABC's private cloud 310 that will be shared with the private cloud of the peer as shown under fields 620 and 630, respectively. Management console 330 may prepopulate the various fields based on information it has about private clouds 310 and 320 and the established trust. Functionalities of the fields may also vary. For example, drop down menus and character entry fields may be used. Additionally, not all shown fields may be required or need to be populated. For example, it may be sufficient for customer ABC to identify a subnet based on its IP address for PES 108 to generate a private cloud path to that subnet. Further, information entered by customer ABC may be custom information that may only be usable to customer XYZ. For example, customer ABC may enter a description of a shared instance that may be presented to customer XYZ. But this description may not be usable to customer ABC when it accesses the shared instance from its computing device 360.

The identification of a subnet may include, for example, a description 622 and an IP address 624. Description 622 may identify the subnet by name, whereas IP address 624 may identify the subnet by an address range or an address of a NAT instance of the subnet. The information about the subnet may also include a security set 626 that may restrict traffic to and from the subnet based on security rules. This security set 626 may be associated with security group 318 of FIG. 3B.

The fields of shared instances 630 may be similar to the fields of the shared subnets 620. FIG. 6A, however, shows another mechanism for defining the configuration of the shared instances. For example, private cloud 310 may include multiple private clouds. Put differently, customer ABC may be associated with more than one private cloud at datacenters 102. These private clouds may execute instances that have similar descriptions. Thus, to configure a virtual network path to a particular instance running on a particular private cloud, customer ABC may enter a description of the particular instance under field 632 and a description of the particular private cloud under field 634. Other techniques may also be implemented by one skilled in the art.

PES 108 may also configure GUI 600 to advertise additional connections that can be generated among customers ABC, XYZ and other entities. For example, GUI 600 may present to customer ABC a list of peers 628 associated with customer XYZ (this list may be referred to herein as a "list of peers of my peer" ("LPP")). A peer from this list may be another entity or customer of PES 108 and may have its own private cloud operating on datacenters 102. The peer's private cloud may have access to customer XYZ's private cloud 320. Thus, LPP 628 may allow customer ABC to get a view of customer XYZ's peers.

An allow transit to peers of my peer ("TPP") field 636 may be used in conjuncture with LPP 628 and may allow customer ABC to agree to virtual network paths between its private cloud 310 and private clouds of customer XYZ's peers (these virtual networks private clouds may be referred to herein as peer private clouds). FIG. 6A illustrates an implementation of TPP field 636 where virtual network paths between private cloud 310 and the peer private clouds of all the peers of customer XYZ may be configured and generated when TPP field 636 is checked. However, other implementations may be also used including an implementation where TPP field 636 may allow customer ABC to agree to a virtual network path between its private cloud 310 and a number of peer private clouds.

TPP field 636 may facilitate the generation of additional virtual network paths without necessarily performing the verification procedure of FIGS. 5A, 5B and 5C. These additional virtual network paths may be associated with the peer private clouds and may be referred to as peer virtual network paths. For example, a third entity, shown in FIG. 6A as customer PQR may be an existing peer of customer XYZ and may have established a trust and a virtual network path between its private cloud and private cloud 320. Customer ABC may permit customer PQR to also access its private cloud 310 by setting-up a peer virtual network path between its private cloud 310 and the private clouds of customer PQR. This permission may be triggered by checking the box of TPP field 636 rendering customer PQR as also a peer of customer ABC.

Different techniques may be used to generate the peer virtual path between private cloud 310 and the private cloud of customer PQR. For example, PES 108 may collect the configuration information that customer ABC enters at GUI 600 and may retrieve the configuration information that customer PQR entered when it connected its private cloud to private cloud 620 of customer XYZ. PES 108 may use the information to generate and provide virtual routing tables to virtual customer edges and virtual provider edges associated with customers ABC and PQR. In another example, when TPP field 636 is checked, PES 108 may generate and provide GUIs similar to GUI 600 to both customers ABC and XYZ for configuring the peer virtual network path between their private clouds. In yet another example, PES 108 may execute an instance at private cloud 320 and may configure the instance as a router that routes traffic between private cloud 310 of customer ABC and the private cloud of customer PQR. PES 108 may or may not integrate this instance with the virtual customer edge of private cloud 320. Further, PES 108 may also configure this instance as a NAT instance or as an instance that includes NAT functionalities such that it may hide the addresses of private cloud 310 from customer PQR and vice versa while also routing traffic between the two private clouds.

In addition to TPP field 636, GUI 600 includes a similar field 638, allow transit of my existing peers ("TEP"), that can be used in conjunction with field 640, list of my existing peers ("LEP"). Field 640 lists the existing peers of customer ABC that are also customers of PES 108 with virtual network paths configured between their private clouds and the private clouds of customer ABC. As illustrated in FIG. 6A, customer 123 is an existing peer of customer ABC. Customer ABC can check field 638 such that its existing peer, e.g., customer 123, can access customer XYZ's private cloud 320 by way of customer ABC's private cloud 310. In other words, when customer ABC checks field 638, PES 108 can generate a virtual network path between the peer private cloud of customer 123 and the private cloud of customer XYZ.

This virtual network path can be by the way of a router instance or a NAT instance hosted in customer ABC's private cloud 310, for example. Other techniques can also be implemented to generate this virtual network path. For example, because PES 108 has addressing information of the private clouds of customers XYZ and 123 and information about the compute resources that are accessible at each private cloud, PES 108 can generate and provide routing tables based on this information to virtual customer edges and virtual provider edges associated with the two customers XYZ and 123.

Fields 636 and 638 can also be used in conjunction across the GUIs of customers ABC and XYZ to synchronize inputs of both customers. For example, PES 108 can provide a GUI similar to GUI 600 to customer XYZ. In turn, customer XYZ can check its field 636, which allows the existing peers of customer ABC to access the private cloud of customer XYZ. But in this example, checking this field may not suffice to generate the virtual network path between customer XYZ and the existing peers of customer ABC. Instead, PES 108 may require customer ABC to also select under its field 638 which of its existing peers can have access to customer's XYZ private cloud 320. Thus, when customer ABC checks the box under field 638 for one of its existing peers, e.g., customer 123, PES 108 may generate the virtual network path between the private clouds of customers XYZ and 123.

Further, customer XYZ can select under its field 636 specific compute resources hosted on its private cloud 320 that can be made accessible to the existing peers of customer ABC. In such a case, the virtual network path between customers XYZ and 123 limits the access of customer 123 to the specific compute resources.

PES 108 can also expand this synchronization across multiple customers such that peers of customer ABC can connect to peers of customer XYZ. In this way, PES 108 can allow daisy chaining of trusts between its various customers. For example, when customer ABC allows customer PQR to access its private cloud 310 by checking its field 636, and when customer XYZ performs a similar action on its GUI and allows customer 123 access to its private cloud 320 by checking its field 636, PES 108 can generate a virtual network path between the peer private clouds of customers 123 and PQR. PES 108 can configure this virtual network by way of instances at private clouds 310 and 320 of customers ABC and XYZ. In another example, PES can generate and provide routing tables to virtual customer edges and virtual provider edges associated with the peer private clouds of customers 123 and PQR based on the addressing information and the authorized access information that it has about the peer private clouds of these two customers.

In addition to the functionalities discussed above, PES 108 may configure GUI 660 to provide customers ABC and XYZ with a view summary of the compute resources that they are sharing.

FIG. 6B illustrates an example of a summary view that shows what customer ABC is sharing with customer XYZ and other entities (shown as customer 123 in FIG. 6B). The summary view may include a list of my peers 652 that have access to compute resources of customer ABC and may identify shared subnets 650 and shared instances 660 that each entity has access to.

Once PES 108 receives from computing devices 360 and 370 information indicative of the compute resources that can be shared between private clouds 310 and 320, PES 108 may generate routing tables that may be used to route data over the private cloud path between the two private clouds. For example, management console 330 may generate virtual routing tables that include information about the topologies of the private clouds and the virtual routers immediately around each virtual customer edge and each virtual provider edge. The information about the topologies may include, among other information, identifications of private cloud destinations and identifications of virtual routers, e.g., virtual customer edges and virtual provider edges. These identifications may be in the form of IP addresses, labels, classless inter-domain routing ("CIDR") notations and the like. FIG. 7 illustrates an example routing table that may be associated with virtual customer edge 316 of private cloud 310, whereas FIG. 8 illustrates an example routing table that may be associated with virtual provider edge 342 of virtual service provider 340.

FIG. 7 assumes the following configuration information. Private cloud 320 has three subnets but customer XYZ has only authorized private cloud 310 to access two of the subnets. One of the two subnets has a network address of 172.16.0.0/16, whereas virtual resources at the other subnet can be addressed through a NAT instance that has a network address of 155.1.1.1. Additionally and as discussed above, traffic from and to private cloud 310 to private cloud 320 is routed through virtual provider edge 342, which may be labeled as VPE1. Based on this configuration information, virtual customer edge routing table 710, associated with virtual customer edge 316, may include a destination column and a target column. The destination column may identify the destination subnets of private cloud 320 accessible by private cloud 310 (shown as 172.16.0.0/16 and 155.1.1.1). The target column may identify virtual provider edge 342 (shown as VPE1) as a virtual router that may be used to route traffic from private cloud 310 since virtual provider edge 342 may be configured to route outbound traffic from private cloud 310 over the virtual network path to private cloud 320.

Similarly, FIG. 8 assumes the following additional configuration information. Private cloud 310 has a single subnet that is accessible by private cloud 320. Instances of the subnet may be addressed via a NAT instance that has an address of 165.2.2.2. Based on this configuration information, virtual provider edge routing table 810 associated with virtual provider edge 342 may include a destination column and a target column. The destination column may identify the destination subnets of private cloud 320 accessible to private cloud 310 (shown as 172.16.0.0/16 and 155.1.1.1) and the destination subnet of private cloud 310 accessible to private cloud 320 (shown as 165.2.2.2). The target column may identify the virtual provider edge (shown as VPE2) that is associated with private cloud 320 as a virtual router that may be used to route traffic to private cloud 320 since this virtual provider edge may be configured to route inbound traffic to private cloud 320 over the virtual network path. Likewise, the target column may also identify virtual customer edge 316 (shown as VCE1) as a virtual router that may be used to route traffic from private cloud 320 since virtual customer edge 316 may be configured to route inbound traffic to private cloud 310 over the virtual network path.

When routing tables 710 and 810 are available at virtual customer edge 316 and virtual provider edge 342, respectively, and when similar tables are available at the virtual customer edge and the virtual provide edge associated with private cloud 320, these routing tables may be used to route traffic between the two networks. An example of routing a packet between two networks using these routing tables is depicted in FIGS. 9A and 9B.

Figure 9A:
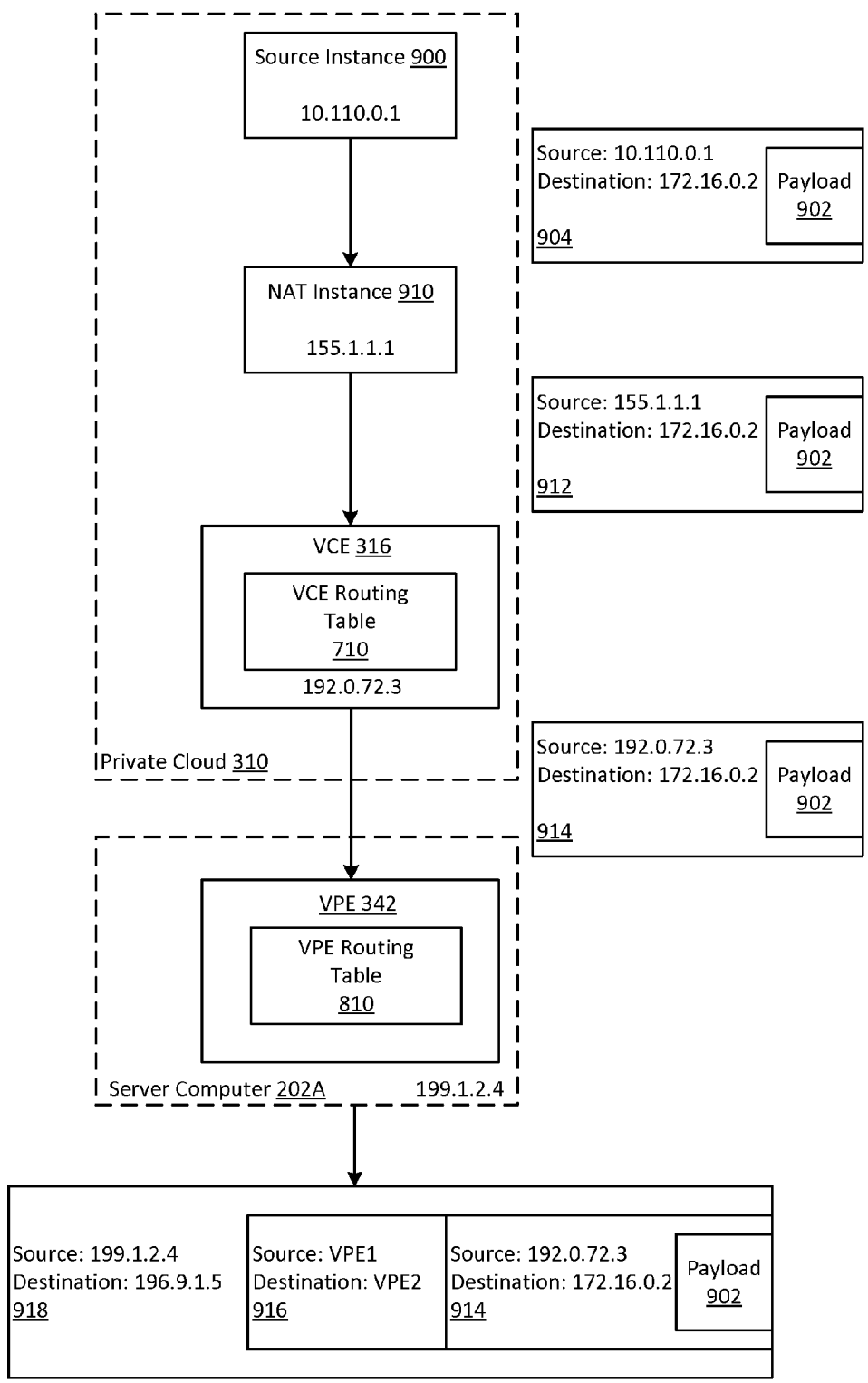
FIGS. 9A and 9B illustrate example addressing of data transmitted between private clouds, according to embodiments.
Figure 9B:
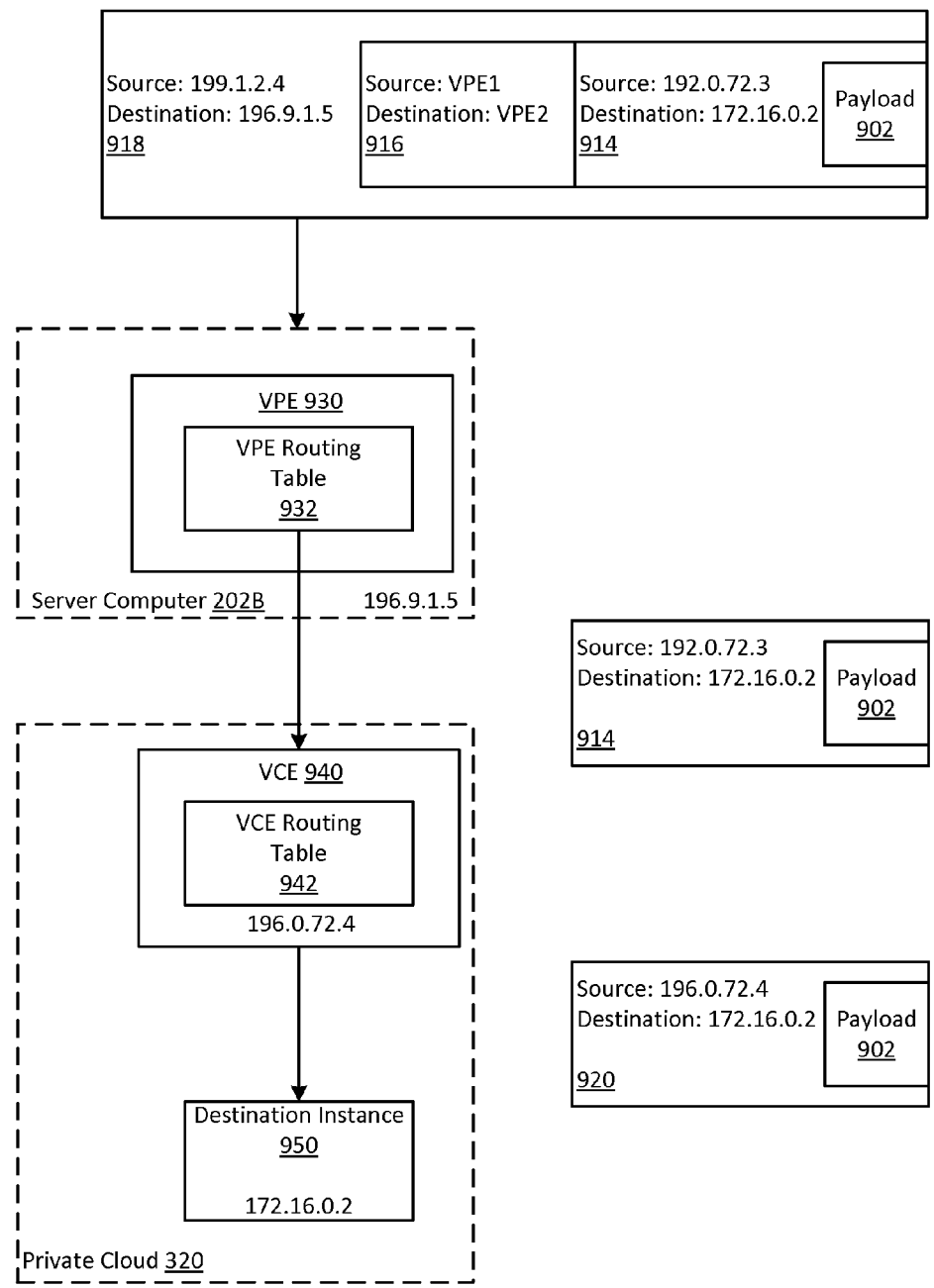

FIGS. 9A and 9B illustrate an example addressing of a packet originating at a source instance 900 of private cloud 310 and destined to a destination instance 950 of private cloud 320. The example assumes the following configuration information in addition to the configuration information of FIGS. 7 and 8. Source instance 900 has an IP address of 10.110.0.1, and the destination instance has an IP address of 172.16.0.2. Virtual customer edge 316 has an address of 192.0.72.03. Virtual provider edge 342 is associated with instance manager 208 hosted on server computer 202A of FIG. 2. Server computer 202A has an IP address of 199.1.2.4. The virtual provider edge associated with private cloud 320 is shown as virtual provider edge 930 and includes a routing table, shown as virtual provider edge routing table 932. Virtual provider edge 930 is associated with an instance manager 208 hosted on server computer 202B of FIG. 2. Server computer 202B has an IP address of 196.9.1.5. The virtual customer edge associated with private cloud 320 is shown as virtual customer edge 940 and includes a routing table, shown as virtual customer edge routing table 942. Virtual customer edge 940 has an IP address of 196.0.72.4.

With this configuration information, a packet may be routed from source instance 900 to destination instance 950. For example, source instance 900 may add an IP header 904 to a payload 902. IP header 904 may include source instance 900's private IP address as the source, and destination instance 950's IP address as the destination (shown as source 10.110.0.1 and destination 172.16.0.2 under IP header 904). Because this destination IP address remains unchanged as the packet is routed between the two private clouds, the description herein below may not reference the destination IP for clarity. The packet may be routed to a NAT instance 910 that may be running on private cloud 310 and that may substitute the source instance 900's private IP address with the NAT instance 910's public IP address (shown as source 10.0.0.0 under IP header 912). NAT instance 910 may route the packet to virtual customer edge 316 that may substitute the NAT instance 910's IP address with its own IP address (shown as source 192.0.72.3 under IP header 914).

When virtual provider edge 342 receives the packet from virtual customer edge 316, virtual provider edge 342 may add a label 916 to the packet and may encapsulate the labeled packet with an IP header 918. IP header 918 may be used to route the packet across the underlying physical network between server computers 202A and 202B. This IP header is shown as source 199.1.2.4 and destination 196.9.1.5. Label 916 may be used to route the packet across the virtual network path. More particularly, label 916 may be used to route the packet directly between virtual provider edge 342 and virtual provider edge 930 associated with private cloud 320. For example, when computer server 202B receives the packet, computer server 202B (or a router at computer server 202B) may remove IP header 918 and direct the packet to virtual provider edge 930 based on label 916. This label is shown as source VPE1 and destination VPE2.

When virtual provider 930 receives the packet, virtual provider edge 930 may remove the label and route the packet to virtual customer edge 940 associated with private cloud 320. In turn, virtual customer edge 940 may update the source IP address in the IP header with its own IP address (shown as source 196.0.72.4 under IP header 920) and route the packet to destination instance 950. FIGS. 9A and 9B illustrate one example of a packet routed between two instances over the private cloud path. Other implementations for routing the packet may be used.

Figure 10:
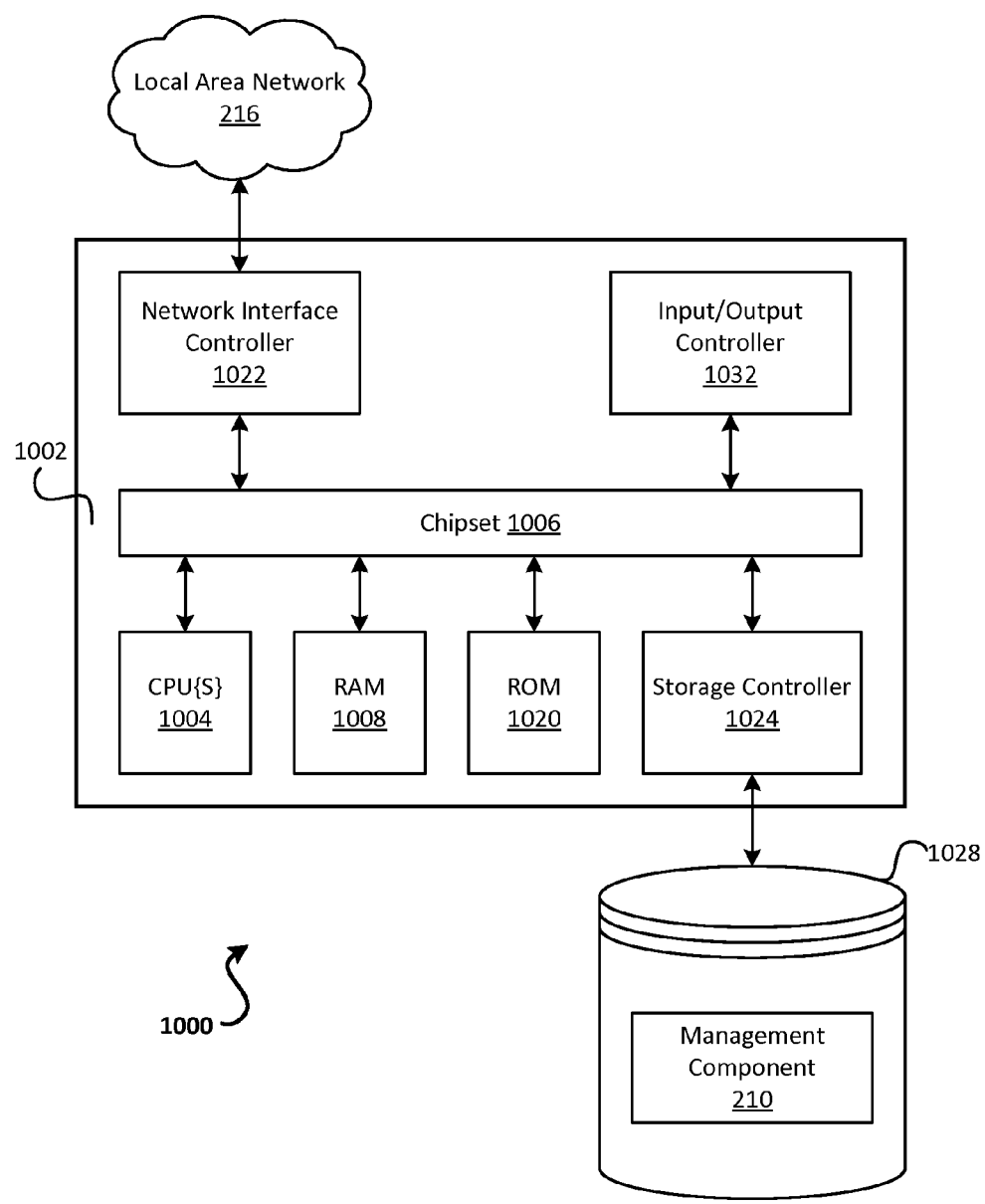
FIG. 10 illustrates an example computer hardware architecture for implementing various computing devices described in embodiments presented herein.

FIG. 10 shows an example computer architecture for a computer 1000 capable of executing the above-described software components. The computer architecture shown in FIG. 10 illustrates a conventional server computer, workstation, desktop computer, laptop, tablet, network appliance, PDA, e-reader, digital cellular phone or other computing device, and may be utilized to execute any aspects of the software components presented herein described as executing within datacenters 102A-102N, on server computers 202A-202N, on the customer computing system 104 or on any other computing system mentioned herein.

Computer 1000 may include a baseboard, or "motherboard," which is a printed circuit board to which a multitude of components or devices may be connected by way of a system bus or other electrical communication paths. One or more central processing units ("CPUs") 1004 may operate in conjunction with a chipset 1006. CPUs 1004 may be standard programmable processors that perform arithmetic and logical operations necessary for the operation of computer 1000.

CPUs 1004 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 1006 may provide an interface between CPUs 1004 and the remainder of the components and devices on the baseboard. Chipset 1006 may provide an interface to a random access memory ("RAM") 1008, used as the main memory in computer 1000. Chipset 1006 may further provide an interface to a computer-readable storage medium such as a read-only memory ("ROM") 1020 or non-volatile RAM ("NVRAM") for storing basic routines that that may help to startup computer 1000 and to transfer information between the various components and devices. ROM 1020 or NVRAM may also store other software components necessary for the operation of computer 1000 in accordance with the embodiments described herein.

Computer 1000 may operate in a networked environment using logical connections to remote computing devices and computer systems through network 216. Chipset 1006 may include functionality for providing network connectivity through a network interface controller ("NIC") 1022, such as a gigabit Ethernet adapter. NIC 1022 may be capable of connecting the computer 1000 to other computing devices over network 216. It should be appreciated that multiple NICs 1022 may be present in computer 1000, connecting the computer to other types of networks and remote computer systems.

Computer 1000 may be connected to a mass storage device 1028 that provides non-volatile storage for the computer. Mass storage device 1028 may store system programs, application programs, other program modules and data, which have been described in greater detail herein. Mass storage device 1028 may be connected to computer 1000 through a storage controller 1024 connected to chipset 1006. Mass storage device 1028 may consist of one or more physical storage units. Storage controller 1024 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 1000 may store data on mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units, whether mass storage device 1028 is characterized as primary or secondary storage and the like.

For example, computer 1000 may store information to mass storage device 1028 by issuing instructions through storage controller 1024 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 1000 may further read information from mass storage device 1028 by detecting the physical states or characteristics of one or more particular locations within the physical storage units.

In addition to mass storage device 1028 described above, computer 1000 may have access to other computer-readable storage media to store and retrieve information, such as program modules, data structures or other data. It should be appreciated by those skilled in the art that computer-readable storage media can be any available media that provides for the storage of non-transitory data and that may be accessed by computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices or any other medium that can be used to store the desired information in a non-transitory fashion.

Mass storage device 1028 may store an operating system 1030 utilized to control the operation of the computer 1000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 1028 may store other system or application programs and data utilized by computer 1000, such as management component 210 and/or the other software components described above.

Mass storage device 1028 or other computer-readable storage media may also be encoded with computer-executable instructions, which, when loaded into computer 1000, transforms the computer from a general-purpose computing system into a special-purpose computer capable of implementing the embodiments described herein. These computer-executable instructions transform computer 1000 by specifying how CPUs 1004 transition between states, as described above. Computer 1000 may have access to computer-readable storage media storing computer-executable instructions, which, when executed by computer 1000, perform the procedures described with regard to FIGS. 4, 5A, 5B and 5C.

Computer 1000 may also include an input/output controller 1032 for receiving and processing input from a number of input devices, such as a keyboard, a mouse, a touchpad, a touch screen, an electronic stylus or other type of input device. Similarly, input/output controller 1032 may provide output to a display, such as a computer monitor, a flat-panel display, a digital projector, a printer, a plotter or other type of output device. It will be appreciated that computer 1000 may not include all of the components shown in FIG. 10, may include other components that are not explicitly shown in FIG. 10 or may utilize an architecture completely different than that shown in FIG. 10.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for configuring communication between virtualized private networks, the system comprising:
    one or more datacenters comprising one or more computing devices configured to communicate with each other over network connections within the one or more datacenters;
    the one or more computing devices further configured to host a first virtualized private network comprising a first compute instance hosted on the one or more computing devices, the first virtualized private network being associated with a first entity;
    the one or more computing devices further configured to host a second virtualized private network comprising a second compute instance hosted on the one or more computing devices, the second virtualized private network associated with a second entity, wherein the second virtualized private network is isolated from the first virtualized private network and wherein the first entity is different from the second entity; and
    one or more memories having stored therein computer-readable instructions that, upon execution on the system, cause the system to at least:
    determine that the first entity has authorized the second entity to access the first compute instance;
    provide the second compute instance with a network address associated with the first virtualized private network via the network connections; and
    route a communication that is addressed with the network address from the second compute instance to the first compute instance via the network connections.

2. The system of claim 1, wherein the communication comprises a packet, and wherein the instructions that, upon execution on the system, cause the system to at least route the communication further cause the system to at least:
    encapsulate the packet with an identifier associated with the first virtualized network and an address associated with a computing device from the one or more computing devices, the first compute instance being instantiated on the computing device.

3. The system of claim 1, wherein the first and second virtualized networks are further configured to communicate with a public network.

4. A method for connecting two or more networks hosted on a private network, the method comprising:
    verifying that a second network has permission to access a first network by receiving information indicative of an authorization to access the first network from a computing node associated with a second entity, wherein the authorization is provided to the second entity from a first entity, the first and second entities being different from each other, the first network being associated with the first entity, the second network being associated with the second entity, and the first network and the second network being isolated from each other, wherein the first network is inaccessible to the second network except by way of the address of the first computing node;
    identifying a first computing node of the first network associated with the permission; and
    generating a network path between the first network and the second network by way of the private network, the network path being based at least in part on an address of the first computing node.

5. The method of claim 4, wherein the first network is a first virtualized private network, wherein the second network is a second virtualized private network.

6. The method of claim 4, wherein the verifying that the second network has permission to access the first network comprises receiving information indicative of the permission from a computing node associated with the first entity.

7. The method of claim 4, wherein the verifying that the second network has permission to access the first network comprises a first verification that the access is permitted and a second verification that the access is permitted, wherein the first verification is associated with verifying the first entity, and wherein the second verification is associated with verifying the second entity.

8. The method of claim 4, wherein the identifying the first computing node of the first network comprises receiving the address of the first computing node.

9. The method of claim 8, wherein the address is an internet protocol (IP) address.

10. The method of claim 9, wherein the IP address is a public IP address of a router that is configured to route traffic to the first computing node, wherein the first network includes the router.

11. The method of claim 4, wherein generating the network path comprises:
    generating a routing table associated with the address of the first computing node; and
    providing the routing table to a router of the private network, wherein the first network and the second network do not include the router.

12. The method of claim 4, further comprising:
    verifying that the first network has permission to access the second network;
    identifying a second computing node of the second network associated with the permission; and
    providing an address of the second computing node to the first network.

13. A non-transitory computer-readable medium comprising instructions that, upon execution on a system of a private network comprising a plurality of computing nodes, cause the system to perform operations comprising:

determining that a first entity associated with a first computing node of the plurality of computing nodes has allowed a second entity associated with a second computing node of the plurality of computing nodes to access the first computing node by way of the private network, wherein the first computing node is on a virtualized network that is isolated from the second computing node and wherein the first entity is different from the second entity, and wherein the virtualized network is inaccessible to the second computing node except by way of the address of the first computing node, the first computing node being previously inaccessible by the second computing node;

identifying a compute resource of the first computing node that the first entity has allowed the second entity to access by way of the second computing node; and generating a network connection between the second computing node and the compute resource based at least in part on the identification of the compute resource, the network connection comprising a third computing node of the plurality of computing nodes.

14. The non-transitory computer-readable medium of claim 13, wherein determining that the first entity has allowed the second entity to access the first computing node by way of the private network comprises:

transmitting first data to a computing device associated with the first entity; and verifying that second data matches the first data, wherein the second data is received from a computing device associated with the second entity.

15. The non-transitory computer-readable medium of claim 13, wherein identifying the compute resource comprises generating an interface configured for use by the first entity and a receipt by way of the interface an address or a description of the compute resource.

16. The non-transitory computer-readable medium of claim 13, wherein the first computing node is a first virtual computing node, wherein the second computing node is a second virtual computing node, and wherein the compute resource is a compute instance.

17. The non-transitory computer-readable medium of claim 16, wherein the network connection comprises a virtual network path between the first virtual computing node and the second virtual computing node.

18. The non-transitory computer-readable medium of claim 17, wherein the virtual network path comprises a first virtual edge that is instantiated at the first virtual computing node, a second virtual edge that is instantiated at the second virtual computing node, a third virtual edge and a fourth virtual edge that are instantiated at the private network and outside of the first virtual computing node and the second virtual computing node, and wherein the first virtual edge, the second virtual edge, the third virtual edge, and the fourth edge are configured to route traffic between the first virtual computing node and the second virtual computing node.

19. The non-transitory computer-readable medium of claim 18, wherein the first virtual edge, the second virtual edge, the third virtual edge, and the fourth edge are associated with a plurality of virtual routing tables, wherein at least one virtual routing table of the plurality of virtual routing comprises addresses of compute instances, and wherein at least a second virtual routing table of the plurality of virtual routing table comprise addresses of compute instances and addresses of physical compute resources.

20. The non-transitory computer-readable medium of claim 19, further comprising instructions that, upon execution on the system, cause the system to perform operations comprising:

determining that the first entity has allowed a third entity to access the first computing node by way of the second computing node.

21. The non-transitory computer-readable medium of claim 20, further comprising instructions that, upon execution on the system, cause the system to perform operations comprising:

configuring an instance at the second computing node for routing data between the first computing node and a computing node of the plurality of computing nodes associated with the third entity.

22. The non-transitory computer-readable medium of claim 20, further comprising instructions that, upon execution on the system, cause the system to perform operations comprising:

determining that the second entity has allowed a fourth entity to access the second computing node by way of the first computing node; and generating a virtual network path between a computing node associated with the third entity and a computing node associated with the fourth entity.

23. The non-transitory computer-readable medium of claim 19, further comprising instructions that, upon execution on the system, cause the system to perform operations comprising:

determining that the first entity has allowed a third entity to access the second computing node by way of the first computing node.

* * * * *